United States Patent
Gupta et al.

(10) Patent No.: US 9,305,056 B1
(45) Date of Patent: Apr. 5, 2016

(54) RESULTS CACHE INVALIDATION

(71) Applicant: Amazon Technologies, Inc., Reno, NV (US)

(72) Inventors: Anurag Windlass Gupta, Atherton, CA (US); Kamal Kant Gupta, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 266 days.

(21) Appl. No.: 13/902,381

(22) Filed: May 24, 2013

(51) Int. Cl.
*G06F 17/30* (2006.01)

(52) U.S. Cl.
CPC .................................. *G06F 17/3048* (2013.01)

(58) Field of Classification Search
CPC .................................................. G06F 17/3048
See application file for complete search history.

(56) References Cited

U.S. PATENT DOCUMENTS

| | | | |
|---|---|---|---|
| 5,280,612 A | 1/1994 | Lorie et al. | |
| 5,471,614 A | 11/1995 | Kakimoto | |
| 5,524,205 A | 6/1996 | Lomet et al. | |
| 5,530,850 A | 6/1996 | Ford et al. | |
| 5,870,758 A | 2/1999 | Bamford et al. | |
| 5,907,848 A | 5/1999 | Zaiken et al. | |
| 6,233,585 B1 | 5/2001 | Gupta et al. | |
| 6,240,413 B1 | 5/2001 | Learmont | |
| 6,615,219 B1 | 9/2003 | Bruso et al. | |
| 6,631,374 B1 | 10/2003 | Klein et al. | |
| 6,732,171 B2 | 5/2004 | Hayden | |
| 6,832,229 B2 | 12/2004 | Reed | |
| 6,976,022 B2 | 12/2005 | Vemuri et al. | |
| 7,010,645 B2 | 3/2006 | Hetzler et al. | |
| 7,089,253 B2 | 8/2006 | Hinshaw et al. | |
| 7,146,386 B2 | 12/2006 | Xiao | |
| 7,305,386 B2 | 12/2007 | Hinshaw et al. | |
| 7,308,456 B2 | 12/2007 | Friske et al. | |
| 7,716,645 B2 | 5/2010 | Dolby et al. | |
| 7,747,663 B2 | 6/2010 | Atkin et al. | |
| 7,885,922 B2 | 2/2011 | Pareek et al. | |
| 7,930,271 B2 | 4/2011 | Tarbell | |
| 7,937,551 B2 | 5/2011 | Schott | |
| 7,979,670 B2 | 7/2011 | Saliba et al. | |

(Continued)

FOREIGN PATENT DOCUMENTS

EP    0675451    10/1995

OTHER PUBLICATIONS

"Amazon Web Services Blog" Downloaded Apr. 30, 2013 from http://aws.typepad.com/aws/2010/10/amazon-rdsannouncing-read-replicas.html, Published Oct. 5, 2010 pp. 1-11.

(Continued)

*Primary Examiner* — William Spieler
(74) *Attorney, Agent, or Firm* — Robert C. Kowert; Meyertons, Hood, Kivlin, Kowert & Goetzel, P.C.

(57) ABSTRACT

Embodiments may include storing a query result in a results set cache with the query result being generated from execution of a particular query on a plurality of data records. One or more probabilistic data structures may be generated based, at least in part, on a subset of the data records that is reflected in the query result. An indication may be received that the plurality of data records has been modified. It may then be determined whether to invalidate the query result in the results set cache based, at least in part, on the one or more probabilistic data structures and a representation of modified plurality of data records.

20 Claims, 6 Drawing Sheets

(56) References Cited

U.S. PATENT DOCUMENTS

| | | | |
|---|---|---|---|
| 8,209,515 | B2 | 6/2012 | Schott |
| 8,255,627 | B2 | 8/2012 | Blinick et al. |
| 8,266,114 | B2 | 9/2012 | Mace et al. |
| 8,271,830 | B2 | 9/2012 | Erofeev |
| 8,289,801 | B2 | 10/2012 | Smith et al. |
| 8,301,670 | B2 | 10/2012 | Revah et al. |
| 8,326,897 | B2 | 12/2012 | Butterworth et al. |
| 8,341,128 | B1 | 12/2012 | Ruggiero |
| 8,370,715 | B2 | 2/2013 | Hafner et al. |
| 8,380,670 | B2 | 2/2013 | Kuber et al. |
| 8,392,479 | B1 | 3/2013 | Pantin |
| 8,396,831 | B2 | 3/2013 | Larson et al. |
| 8,412,689 | B2 | 4/2013 | Reid et al. |
| 8,412,752 | B2 | 4/2013 | Dodge |
| 8,429,121 | B2 | 4/2013 | Pareek et al. |
| 2002/0107835 | A1 | 8/2002 | Coram et al. |
| 2002/0143733 | A1 | 10/2002 | Mukkamalla et al. |
| 2004/0133622 | A1 | 7/2004 | Clubb et al. |
| 2004/0249799 | A1* | 12/2004 | Demarcken et al. ............... 707/3 |
| 2004/0249869 | A1 | 12/2004 | Oksanen |
| 2007/0055650 | A1* | 3/2007 | Duncan et al. .................... 707/3 |
| 2007/0300243 | A1* | 12/2007 | Gross et al. .................. 719/330 |
| 2008/0183973 | A1 | 7/2008 | Aguilera et al. |
| 2010/0050172 | A1 | 2/2010 | Ferris |
| 2010/0192131 | A1 | 7/2010 | Dolby et al. |
| 2011/0035548 | A1 | 2/2011 | Kimmel et al. |
| 2011/0161496 | A1 | 6/2011 | Nicklin |
| 2012/0041899 | A1 | 2/2012 | Greene et al. |
| 2012/0174112 | A1 | 7/2012 | Vaidya et al. |
| 2012/0191648 | A1 | 7/2012 | Kuber et al. |
| 2012/0297073 | A1 | 11/2012 | Glover et al. |
| 2012/0310985 | A1 | 12/2012 | Gale et al. |
| 2012/0310986 | A1 | 12/2012 | Frantz et al. |
| 2012/0310991 | A1 | 12/2012 | Frantz et al. |
| 2013/0036281 | A1 | 2/2013 | Revah et al. |
| 2013/0042156 | A1 | 2/2013 | Srinivasan et al. |
| 2013/0080386 | A1 | 3/2013 | Dwyer et al. |
| 2013/0080388 | A1 | 3/2013 | Dwyer et al. |
| 2013/0086129 | A1 | 4/2013 | Brown et al. |
| 2013/0159283 | A1* | 6/2013 | Broll et al. ..................... 707/716 |
| 2014/0052750 | A1* | 2/2014 | Ciabrini et al. ............... 707/769 |
| 2014/0310232 | A1* | 10/2014 | Plattner et al. ................ 707/602 |

OTHER PUBLICATIONS

Michele Cyran et al "Oracle Database Concepts 10g Release 2 (10.2)" Oct. 2005, pp. 1-542.

Lance Ashdown et al "Oracle Database Concepts 11g Release 2 (11.2)" Sep. 2011, pp. 1-460.

"Isolation (database systems)" downloaded from http://en.wikipedia.org/wiki/Isolation_(database_systems) on May 15, 2013, pp. 1-7.

U.S. Appl. No. 13/892,027, filed May 10, 2013, Anurag Windlass Gupta.

U.S. Appl. No. 13/873,467, filed Apr. 20, 2013, Anurag Windlass Gupta.

U.S. Appl. No. 13/893,004, filed May 13, 2013, Laurion Darrell Burchall.

U.S. Appl. No. 13/901,111, filed May 23, 2013, Anurag Windlass Gupta.

U.S. Appl. No. 13/894,969, filed May 25, 2013, Grant Alexander MacDonald McAlister.

U.S. Appl. No. 13/903,674, filed May 28, 2013, Anurag Windlass Gupta.

"Bloom Filter" Downloaded from http://en.wikipedia.org/wiki/Bloom_filter on May 15, 2013, pp. 1-12.

John Clarke "SQL Result Set Cache in Oracle 11gR2" published Nov. 16, 2011 downloaded May 15, 2013 from http://www.centroid.com/knowledgebase/blog/sql-result-set-cache-in-oracle-11gr2, pp. 1-27.

Jim Czuprynski "Oracle Database 11g: SQL Query Result Set Caching" published Jul. 30, 2008, downloaded May 15, 2013 from http://www.databasejournal.com/features/oracle/article.php/3760761/Oracle-Database-11g-SQL-Query-Result-Set-Caching.htm, pp. 1-7.

"Oracle Database JDBC Developer's Guide and Reference: Chapter 20 Statement and Result Set Caching" downloaded from http://docs.oracle.com/cd/B28359_01/java.111/b31224/stmtcach.htm via the Wayback Machine Nov. 27, 2011, pp. 1-8.

Adrian Billington "Query Result Cache in Oracle 11g" downloaded from http://web.archive.org/web/20080124161135/http://www.oracle-developer.net/display.php?id=503 via the Wayback Machine Jan. 4, 2008, pp. 1-20.

Julian Dontcheff "Bloom Filters for DBAs" published Aug. 28, 2012, downloaded from http://juliandontcheff.wordpress.com/2012/08/28/bloom-filters-for-dbas/ on May 14, 2013, pp. 1-4.

Julian Dyke "Result Cache Internals" Nov. 2007, pp. 1-38.

* cited by examiner

RESULTS CACHE INVALIDATION

BACKGROUND

In addition to buffer caches used to reduce I/Os, results set caches may be used by some database systems to permit the results of a given SQL statement to be cached based on an exact match of the SQL string. In doing so, for a subsequent query that matches the given SQL statement, then the SQL statement may not need to be re-executed; instead, the results set cache entry may be returned. Current systems, however, do not handle results set cache invalidation well. For example, such systems are overly aggressive in invalidating results set cache entries.

Figure 1:
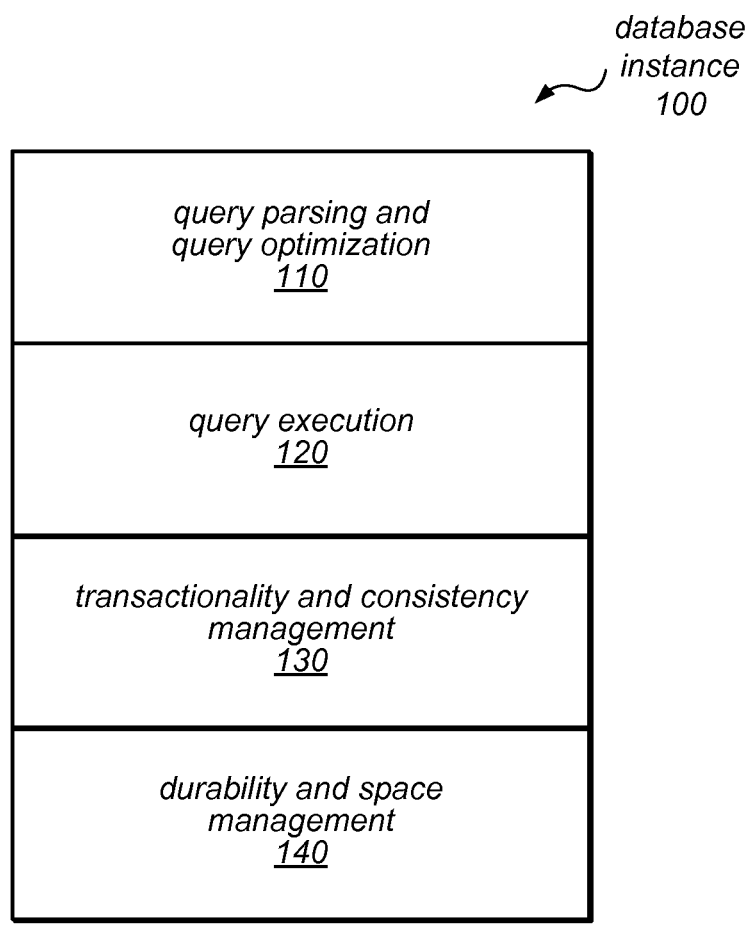
FIG. 1 is a block diagram illustrating various components of a database software stack, according to one embodiment.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a computer system may be configured to perform operations even when the operations are not currently being performed).

In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. §112, paragraph six, interpretation for that component.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION

Various embodiments of results set cache invalidation are disclosed. Various ones of the present embodiments may include storing a query result, generated from execution of a particular query on a plurality of data records, in a results set cache. Various ones of the present embodiments may include generating one or more probabilistic data structures (e.g., bloom filter(s)) based, at least in part, on a subset of the data records that is reflected in the query result. Various ones of the present embodiments may also include receiving an indication that the plurality of data records has been modified. Various ones of the present embodiments may further include determining whether to invalidate (e.g., deleted, or otherwise marked as invalid) the query result in the results set cache based, at least in part, on the one or more probabilistic data structures and a representation of modified plurality of data records.

The specification first describes an example web services-based database service configured to implement the disclosed results set cache invalidation techniques. Included in the description of the example web services-based database service are various aspects of the example web services-based database service, such as a database engine and a separate distributed database storage service (note that the web services-based database service is exemplary and, in some embodiments, the storage service may not be separate from the database engine and in other embodiments, the disclosed techniques may apply in systems other than database services). The specification then describes flowcharts of various embodiments of methods for results set cache invalidation.

Next, the specification describes an example system that may implement the disclosed techniques. Various examples are provided throughout the specification.

Although the disclosed results cache invalidation techniques may be implemented in a variety of different database systems, the specification describes, in detail, an example system that, in some embodiments, may implement a web service that enables clients (e.g., subscribers) to operate a data storage system in a cloud computing environment. In some embodiments, the data storage system may be an enterprise-class database system that is highly scalable and extensible. In some embodiments, queries may be directed to database storage that is distributed across multiple physical resources, and the database system may be scaled up or down on an as needed basis. The database system may work effectively with database schemas of various types and/or organizations, in different embodiments. In some embodiments, clients/subscribers may submit queries in a number of ways, e.g., interactively via an SQL interface to the database system. In other embodiments, external applications and programs may submit queries using Open Database Connectivity (ODBC) and/or Java Database Connectivity (JDBC) driver interfaces to the database system.

More specifically, the example systems described herein may, in some embodiments, implement a service-oriented database architecture in which various functional components of a single database system are intrinsically distributed. For example, rather than lashing together multiple complete and monolithic database instances (each of which may include extraneous functionality, such as an application server, search functionality, or other functionality beyond that required to provide the core functions of a database), these systems may organize the basic operations of a database (e.g., query processing, transaction management, caching and storage) into tiers that may be individually and independently scalable. For example, in some embodiments, each database instance in the systems described herein may include a database tier (which may include a single database engine head node and a client-side storage system driver), and a separate, distributed storage system (which may include multiple storage nodes that collectively perform some of the operations traditionally performed in the database tier of existing systems). As noted herein, the described results cache invalidation techniques may apply equally in other systems as well.

As described in more detail herein, in some embodiments, some of the lowest level operations of a database, (e.g., backup, restore, recovery, log record manipulation, and/or various space management operations) may be offloaded from the database engine to the storage layer and distributed across multiple nodes and storage devices. For example, in some embodiments, rather than the database engine applying changes to database tables (or data pages thereof) and then sending the modified data pages to the storage layer, the application of changes to the stored database tables (and data pages thereof) may be the responsibility of the storage layer itself. In such embodiments, redo log records, rather than modified data pages, may be sent to the storage layer, after which redo processing (e.g., the application of the redo log records) may be performed somewhat lazily and in a distributed manner (e.g., by a background process). In some embodiments, crash recovery (e.g., the rebuilding of data pages from stored redo log records) may also be performed by the storage layer and may also be performed by a distributed (and, in some cases, lazy) background process.

In some embodiments, because only redo logs (and not modified data pages) are sent to the storage layer, network traffic between the database tier and the storage layer may be greatly reduced compared to network traffic in existing database systems. In some embodiments, each redo log may be on the order of one-tenth the size of the corresponding data page for which it specifies a change. Note that requests sent from the database tier and the distributed storage system may be asynchronous and that multiple such requests may be in flight at a time.

In general, after being given a piece of data, a primary requirement of a database is that it can eventually give that same piece of data back. To do this, the database may include several different components (or tiers), each of which performs a different function. For example, a traditional database may be thought of as having three tiers: a first tier for performing query parsing, optimization and execution; a second tier for providing transactionality, recovery, and durability; and a third tier that provides storage, either on locally attached disks or on network-attached storage. As noted above, traditional attempts to scale a traditional database have typically involved replicating all three tiers of the database and distributing those replicated database instances across multiple machines.

In some embodiments, the systems described herein may partition functionality of a database system differently than in a traditional database, and may distribute only a subset of the functional components (rather than a complete database instance) across multiple machines in order to implement scaling. For example, in some embodiments, a client-facing tier may be configured to receive a request specifying what data is to be stored or retrieved, but not how to store or retrieve the data. This tier may perform request parsing and/or optimization (e.g., SQL parsing and optimization, the disclosed results set cache invalidation techniques, etc.), while another tier may be responsible for query execution. In some embodiments, a third tier may be responsible for providing transactionality and consistency of results. For example, this tier may be configured to enforce some of the so-called ACID properties, in particular, the Atomicity of transactions that target the database, maintaining Consistency within the database, and ensuring Isolation between the transactions that target the database. In some embodiments, the first tier may implement the disclosed results set cache invalidation techniques. In some embodiments, a fourth tier may then be responsible for providing Durability of the stored data in the presence of various sorts of faults. For example, this tier may be responsible for change logging, recovery from a database crash, managing access to the underlying storage volumes and/or space management in the underlying storage volumes.

Turning now to the figures, FIG. 1 is a block diagram illustrating various components of a database software stack, according to one embodiment. As illustrated in this example, a database instance may include multiple functional components (or layers), each of which provides a portion of the functionality of the database instance. In this example, database instance 100 includes a query parsing and query optimization layer (shown as 110), a query execution layer (shown as 120), a transactionality and consistency management layer (shown as 130), and a durability and space management layer (shown as 140). As noted above, in some existing database systems, scaling a database instance may involve duplicating the entire database instance one or more times (including all of the layers illustrated in FIG. 1), and then adding glue logic to stitch them together. In some embodiments, the systems described herein may instead offload the functionality of durability and space management layer 140 from the database tier to a separate storage layer, and may distribute that functionality across multiple storage nodes in the storage layer.

Note that the disclosed results set cache invalidation techniques may also apply in embodiments in which the durability and space management layer 140 is part of the database tier.

In various embodiments, the database systems described herein may support a standard or custom application programming interface (API) for a variety of database operations/transactions. For example, the API may support operations for creating a database, creating a table, altering a table, creating a user, dropping a user, inserting one or more rows in a table, copying values, selecting data from within a table (e.g., querying a table), canceling or aborting a query, and/or other operations.

In some embodiments, the database tier of a database instance may include a database engine head node server that receives read and/or write requests (and/or other transaction requests) from various client programs (e.g., applications) and/or subscribers (users), then parses them and develops an execution plan to carry out the associated database operation(s). For example, the database engine head node may develop the series of steps necessary to obtain results for complex queries and joins. In some embodiments, the database engine head node may manage communications between the database tier of the database system and clients/subscribers, as well as communications between the database tier and a separate distributed database-optimized storage system. In some embodiments, as described in more detail below, the database engine head node may be configured to perform the disclosed results set cache invalidation techniques.

In some embodiments, the database tier (or more specifically, the database engine head node) may include a cache in which recently accessed data pages are held temporarily. In such embodiments, if a write request is received that targets a data page in such a cache, in addition to shipping a corresponding redo log record to the storage layer, the database engine may apply the change to the copy in its cache. However, unlike in other database systems, a data page held in this cache may not ever be flushed to the storage layer, and it may be discarded at any time (e.g., at any time after the redo log record for a write request that was most recently applied to the cached copy has been sent to the storage layer and acknowledged). The cache may implement any of various locking mechanisms to control access to the cache by at most one writer (or multiple readers) at a time, in different embodiments. Note, however, that in embodiments that include such a cache, the cache may not be distributed across multiple nodes, but may exist only on the database engine head node for a given database instance. Therefore, there may be no cache coherency or consistency issues to manage. Also note, though, that multiple database instances, each with a database engine head node, may exist.

In addition, in some embodiments, the database tier (e.g., the database engine head node) may include a results set cache in which the results of recently executed queries (e.g., SQL statements) may be stored. In such embodiments, a particular results set cache entry may be associated with a hash of a string of the particular database query to which the results set cache entry corresponds. If the system receives a subsequent database query that has a hash that matches the particular database query, the corresponding results set cache entry may be returned to the client without having to re-execute the query. As described herein, the disclosed techniques may determine whether to invalidate (e.g., deleted, and/or other marked as invalid, etc.) one or more results set cache entries.

In some embodiments, the database tier may support the use of synchronous or asynchronous read replicas in the system, e.g., read-only copies of data on different nodes of the database tier to which read requests can be routed. In such embodiments, if the database engine head node for a given database table receives a read request directed to a particular data page, it may route the request to any one (or a particular one) of these read-only copies. In some embodiments, the client-side driver in the database engine head node may be configured to notify these other nodes about updates and/or invalidations to cached data pages (e.g., in order to prompt them to invalidate their caches, after which they may request updated copies of updated data pages from the storage layer).

In some embodiments, the client side driver may maintain metadata about the volume and may directly send asynchronous requests to each of the storage nodes necessary to fulfill read requests and write requests without requiring additional hops between storage nodes. For example, in some embodiments, in response to a request to make a change to a database table, the client-side driver may be configured to determine the one or more nodes that are implementing the storage for the targeted data page, and to route the redo log record(s) specifying that change to those storage nodes. The storage nodes may then be responsible for applying the change specified in the redo log record to the targeted data page at some point in the future. As writes are acknowledged back to the client-side driver, the client-side driver may advance the point at which the volume is durable and may acknowledge commits back to the database tier. As previously noted, in some embodiments, the client-side driver may not ever send data pages to the storage node servers. This may not only reduce network traffic, but may also remove the need for the checkpoint or background writer threads that constrain foreground-processing throughput in previous database systems.

In some embodiments, many read requests may be served by the database engine head node cache and/or the results set cache. However, write requests may require durability, since large-scale failure events may be too common to allow only in-memory replication. Therefore, the systems described herein may be configured to minimize the cost of the redo log record write operations that are in the foreground latency path by implementing data storage in the storage tier as two regions: a small append-only log-structured region into which redo log records are written when they are received from the database tier, and a larger region in which log records are coalesced together to create new versions of data pages in the background. In some embodiments, an in-memory structure may be maintained for each data page that points to the last redo log record for that page, backward chaining log records until an instantiated data block is referenced. This approach may provide good performance for mixed read-write workloads, including in applications in which reads are largely cached.

Figure 2:
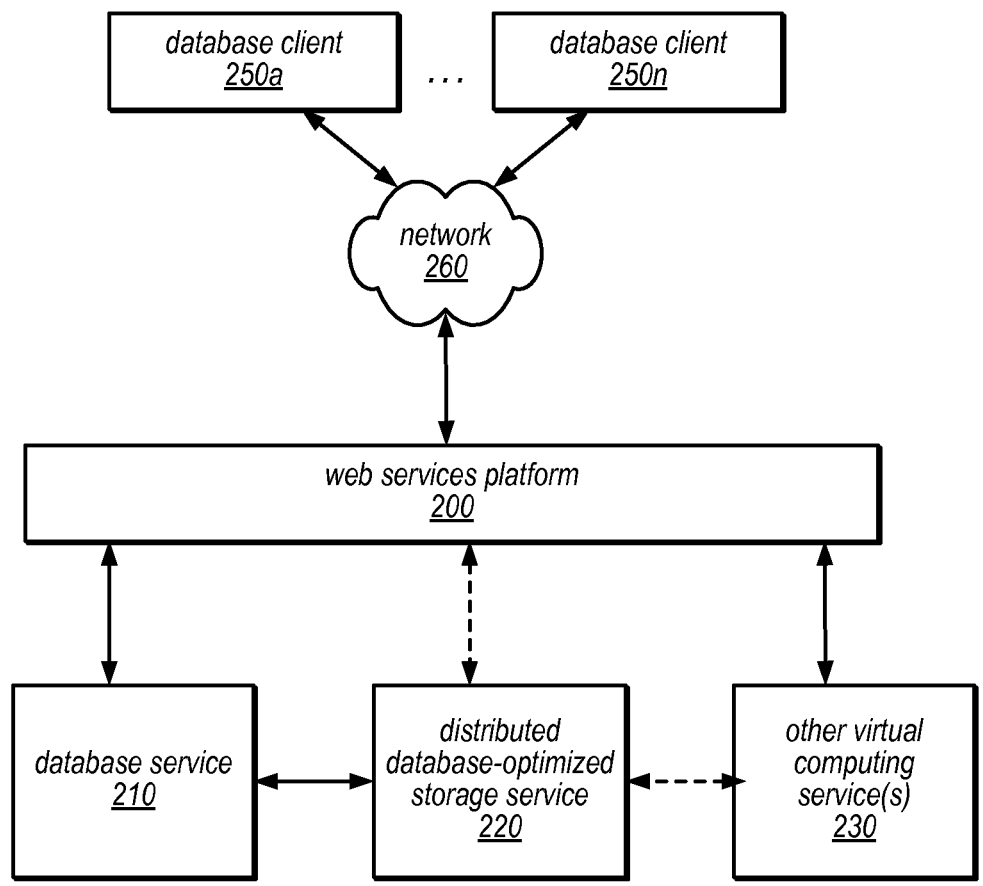
FIG. 2 is a block diagram illustrating a service system architecture that may be configured to implement a web services-based database service configured to perform results set cache invalidation, according to some embodiments.

One embodiment of a service system architecture that may be configured to implement a web services-based database service is illustrated in FIG. 2. In the illustrated embodiment, a number of clients (shown as database clients 250*a*-250*n*) may be configured to interact with a web services platform 200 via a network 260. Web services platform 200 may be configured to interface with one or more instances of a database service 210, a distributed database-optimized storage service 220 and/or one or more other virtual computing services 230. It is noted that where one or more instances of a given component may exist, reference to that component herein may be made in either the singular or the plural. However, usage of either form is not intended to preclude the other.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 6 and described below. In various embodiments, the functionality of a given service system component (e.g., a component of the database service or a component of the storage service) may be implemented by a particular node or may be distributed across several nodes. In some embodiments, a given node may implement the functionality of more than one service system component (e.g., more than one database service system component).

Generally speaking, clients 250 may encompass any type of client configurable to submit web services requests to web services platform 200 via network 260, including requests for database services (e.g., a read request, etc.). For example, a given client 250 may include a suitable version of a web browser, or may include a plug-in module or other type of code module configured to execute as an extension to or within an execution environment provided by a web browser. Alternatively, a client 250 (e.g., a database service client) may encompass an application such as a database application (or user interface thereof), a media application, an office application or any other application that may make use of persistent storage resources to store and/or access one or more database tables. In some embodiments, such an application may include sufficient protocol support (e.g., for a suitable version of Hypertext Transfer Protocol (HTTP)) for generating and processing web services requests without necessarily implementing full browser support for all types of web-based data. That is, client 250 may be an application configured to interact directly with web services platform 200. In some embodiments, client 250 may be configured to generate web services requests according to a Representational State Transfer (REST)-style web services architecture, a document- or message-based web services architecture, or another suitable web services architecture.

In some embodiments, a client 250 (e.g., a database service client) may be configured to provide access to web services-based storage of database tables to other applications in a manner that is transparent to those applications. For example, client 250 may be configured to integrate with an operating system or file system to provide storage in accordance with a suitable variant of the storage models described herein. However, the operating system or file system may present a different storage interface to applications, such as a conventional file system hierarchy of files, directories and/or folders. In such an embodiment, applications may not need to be modified to make use of the storage system service model of FIG. 1. Instead, the details of interfacing to Web services platform 200 may be coordinated by client 250 and the operating system or file system on behalf of applications executing within the operating system environment.

Clients 250 may convey web services requests (e.g., a transaction request, read request, etc.) to and receive responses from web services platform 200 via network 260. In various embodiments, network 260 may encompass any suitable combination of networking hardware and protocols necessary to establish web-based communications between clients 250 and platform 200. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 250 and web services platform 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and web services platform 200. It is noted that in some embodiments, clients 250 may communicate with web services platform 200 using a private network rather than the public Internet. For example, clients 250 may be provisioned within the same enterprise as a database service system (e.g., a system that implements database service 210 and/or distributed database-optimized storage service 220). In such a case, clients 250 may communicate with platform 200 entirely through a private network 260 (e.g., a LAN or WAN that may use Internet-based communication protocols but which is not publicly accessible).

Generally speaking, web services platform 200 may be configured to implement one or more service endpoints configured to receive and process web services requests, such as requests to access data pages (or records thereof). For example, web services platform 200 may include hardware and/or software configured to implement a particular endpoint, such that an HTTP-based web services request directed to that endpoint is properly received and processed. In one embodiment, web services platform 200 may be implemented as a server system configured to receive web services requests from clients 250 and to forward them to components of a system that implements database service 210, distributed database-optimized storage service 220 and/or another virtual computing service 230 for processing. In other embodiments, web services platform 200 may be configured as a number of distinct systems (e.g., in a cluster topology) implementing load balancing and other request management features configured to dynamically manage large-scale web services request processing loads. In various embodiments, web services platform 200 may be configured to support REST-style or document-based (e.g., SOAP-based) types of web services requests.

In addition to functioning as an addressable endpoint for clients' web services requests, in some embodiments, web services platform 200 may implement various client management features. For example, platform 200 may coordinate the metering and accounting of client usage of web services, including storage resources, such as by tracking the identities of requesting clients 250, the number and/or frequency of client requests, the size of data tables (or records thereof) stored or retrieved on behalf of clients 250, overall storage bandwidth used by clients 250, class of storage requested by clients 250, or any other measurable client usage parameter. Platform 200 may, in some embodiments, be configured to distribute a client web services request to a particular database engine head node of its respective database instance. As a simple example, at a time 1, platform 200 may distribute a read request to database engine head node 1 and at a time 3, platform may distribute a write request to database engine head node 2. Platform 200 may also implement financial accounting and billing systems, or may maintain a database of usage data that may be queried and processed by external systems for reporting and billing of client usage activity. In certain embodiments, platform 200 may be configured to collect, monitor and/or aggregate a variety of storage service system operational metrics, such as metrics reflecting the rates and types of requests received from clients 250, bandwidth utilized by such requests, system processing latency for such requests, system component utilization (e.g., network bandwidth and/or storage utilization within the storage service system), rates and types of errors resulting from requests, characteristics of stored and requested data pages or records thereof (e.g., size, data type, etc.), or any other suitable metrics. In some embodiments such metrics may be used by system administrators to tune and maintain system components, while in other embodiments such metrics (or relevant portions of such metrics) may be exposed to clients 250 to enable such clients to monitor their usage of database service 210, distributed database-optimized storage service 220 and/or another virtual computing service 230 (or the underlying systems that implement those services).

In some embodiments, platform 200 may also implement user authentication and access control procedures. For example, for a given web services request to access a particular database table, platform 200 may be configured to ascertain whether the client 250 associated with the request is authorized to access the particular database table. Platform 200 may determine such authorization by, for example, evaluating an identity, password or other credential against credentials associated with the particular database table, or evaluating the requested access to the particular database table against an access control list for the particular database table. For example, if a client 250 does not have sufficient credentials to access the particular database table, platform 200 may reject the corresponding web services request, for example by returning a response to the requesting client 250 indicating an error condition. Various access control policies may be stored as records or lists of access control information by database service 210, distributed database-optimized storage service 220 and/or other virtual computing services 230.

It is noted that while web services platform 200 may represent the primary interface through which clients 250 may access the features of a database system that implements database service 210, it need not represent the sole interface to such features. For example, an alternate API that may be distinct from a web services interface may be used to allow clients internal to the enterprise providing the database system to bypass web services platform 200. Note that in many of the examples described herein, distributed database-optimized storage service 220 may be internal to a computing system or an enterprise system that provides database services to clients 250, and may not be exposed to external clients (e.g., users or client applications). In such embodiments, the internal "client" (e.g., database service 210) may access distributed database-optimized storage service 220 over a local or private network, shown as the solid line between distributed database-optimized storage service 220 and database service 210 (e.g., through an API directly between the systems that implement these services). In such embodiments, the use of distributed database-optimized storage service 220 in storing database tables on behalf of clients 250 may be transparent to those clients. In other embodiments, distributed database-optimized storage service 220 may be exposed to clients 250 through web services platform 200 to provide storage of database tables or other information for applications other than those that rely on database service 210 for database management. This is illustrated in FIG. 2 by the dashed line between web services platform 200 and distributed database-optimized storage service 220. In such embodiments, clients of the distributed database-optimized storage service 220 may access distributed database-optimized storage service 220 via network 260 (e.g., over the Internet). In some embodiments, a virtual computing service 230 may be configured to receive storage services from distributed database-optimized storage service 220 (e.g., through an API directly between the virtual computing service 230 and distributed database-optimized storage service 220) to store objects used in performing computing services 230 on behalf of a client 250. This is illustrated in FIG. 2 by the dashed line between virtual computing service 230 and distributed database-optimized storage service 220. In some cases, the accounting and/or credentialing services of platform 200 may be unnecessary for internal clients such as administrative clients or between service components within the same enterprise.

Note that in various embodiments, different storage policies may be implemented by database service 210 and/or distributed database-optimized storage service 220. Examples of such storage policies may include a durability policy (e.g., a policy indicating the number of instances of a database table (or data page thereof) that will be stored and the number of different nodes on which they will be stored) and/or a load balancing policy (which may distribute database tables, or data pages thereof, across different nodes, volumes and/or disks in an attempt to equalize request traffic). In addition, different storage policies may be applied to different types of stored items by various one of the services. For example, in some embodiments, distributed database-optimized storage service 220 may implement a higher durability for redo log records than for data pages.

Figure 3:
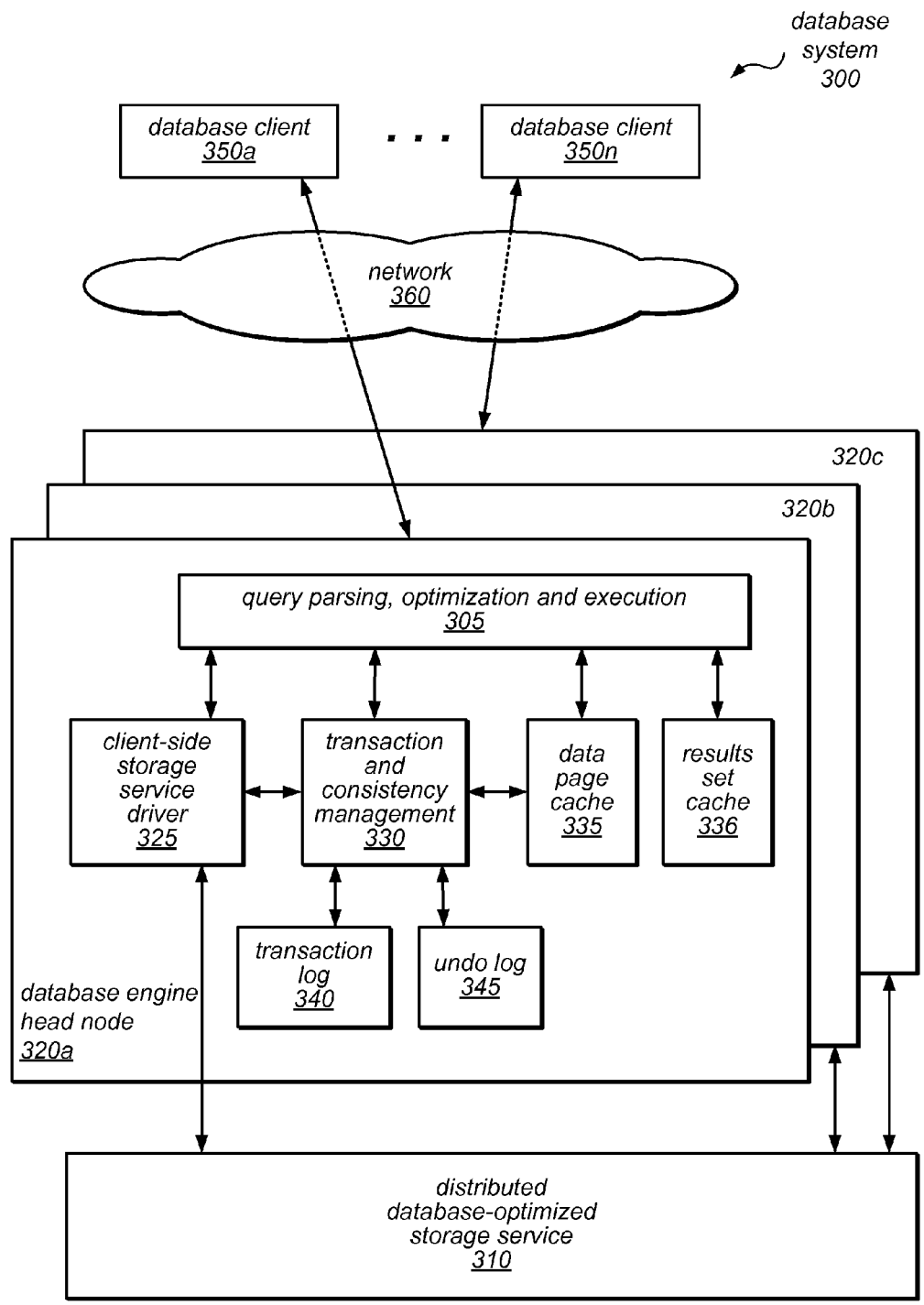
FIG. 3 is a block diagram illustrating various components of a database system configured to perform results set cache invalidation, according to one embodiment.

FIG. 3 is a block diagram illustrating various components of an example database system that can be used with the disclosed results set cache invalidation techniques. The example database system includes a database engine and a separate distributed database storage service, according to one embodiment. In this example, database system 300 includes a respective database engine head node 320 for each of several database tables and a distributed database-optimized storage service 310 (which may or may not be visible to the clients of the database system, shown as database clients 350*a*-350*n*). As illustrated in this example, one or more of database clients 350*a*-350*n* may access a database head node 320 (e.g., head node 320*a*, head node 320*b*, or head node 320*c*, each of which is a component of a respective database instance) via network 360 (e.g., these components may be network-addressable and accessible to the database clients 350*a*-350*n*). However, distributed database-optimized storage service 310, which may be employed by the database system to store data pages of one or more database tables (and redo log records and/or other metadata associated therewith) on behalf of database clients 350*a*-350*n*, and to perform other functions of the database system as described herein, may or may not be network-addressable and accessible to the storage clients 350*a*-350*n*, in different embodiments. For example, in some embodiments, distributed database-optimized storage service 310 may perform various storage, access, change logging, recovery, log record manipulation, and/or space management operations in a manner that is invisible to storage clients 350*a*-350*n*.

As previously noted, each database instance may include a single database engine head node 320 that receives requests (e.g., a read request/query, etc.) from various client programs (e.g., applications) and/or subscribers (users), then parses them, optimizes them, and develops an execution plan to carry out the associated database operation(s). For example, if a results set cache entry exists (e.g., stored in results set cache 336) for a particular database query, that particular database read request/query may not actually be executed but, instead, the results set entry of results set cache 336 may be returned to the client. In the example illustrated in FIG. 3, a query parsing, optimization, and execution component 305 of database engine head node 320a may perform these functions for queries that are received from database client 350a and that target the database instance of which database engine head node 320a is a component. In some embodiments, query parsing, optimization, and execution component 305 may return query responses to database client 350a, which may include write acknowledgements, requested data pages (or portions thereof), error messages, and or other responses, as appropriate. As illustrated in this example, database engine head node 320a may also include a client-side storage service driver 325, which may route read requests and/or redo log records (e.g., from writes) to various storage nodes within distributed database-optimized storage service 310, receive write acknowledgements from distributed database-optimized storage service 310, receive requested data pages from distributed database-optimized storage service 310, and/or return data pages, error messages, or other responses to query parsing, optimization, and execution component 305 (which may, in turn, return them to database client 350a).

In this example, database engine head node 320a includes data page cache 335, in which data pages that were recently accessed may be temporarily held and also includes results set cache 336, in which results from a database query may be stored. Results set cache 336 may also store one or more associated values (e.g., output(s) from one or more probabilistic data structures) with a given cache entry. As illustrated in FIG. 3, database engine head node 320a may also include a transaction and consistency management component 330, which may be responsible for providing transactionality and consistency in the database instance of which database engine head node 320a is a component. For example, this component may be responsible for ensuring the Atomicity, Consistency, and Isolation properties of the database instance and the transactions that are directed that the database instance.

As illustrated in FIG. 3, database engine head node 320a may also include a transaction log 340 and an undo log 345, which may be employed by transaction and consistency management component 330 to track the status of various transactions and roll back any locally cached results of transactions that do not commit.

Note that each of the other database engine head nodes 320 illustrated in FIG. 3 (e.g., 320b and 320c) may include similar components and may perform similar functions for queries and/or other transactions received by one or more of database clients 350a-350n and directed to the respective database instances of which it is a component.

Figure 4:
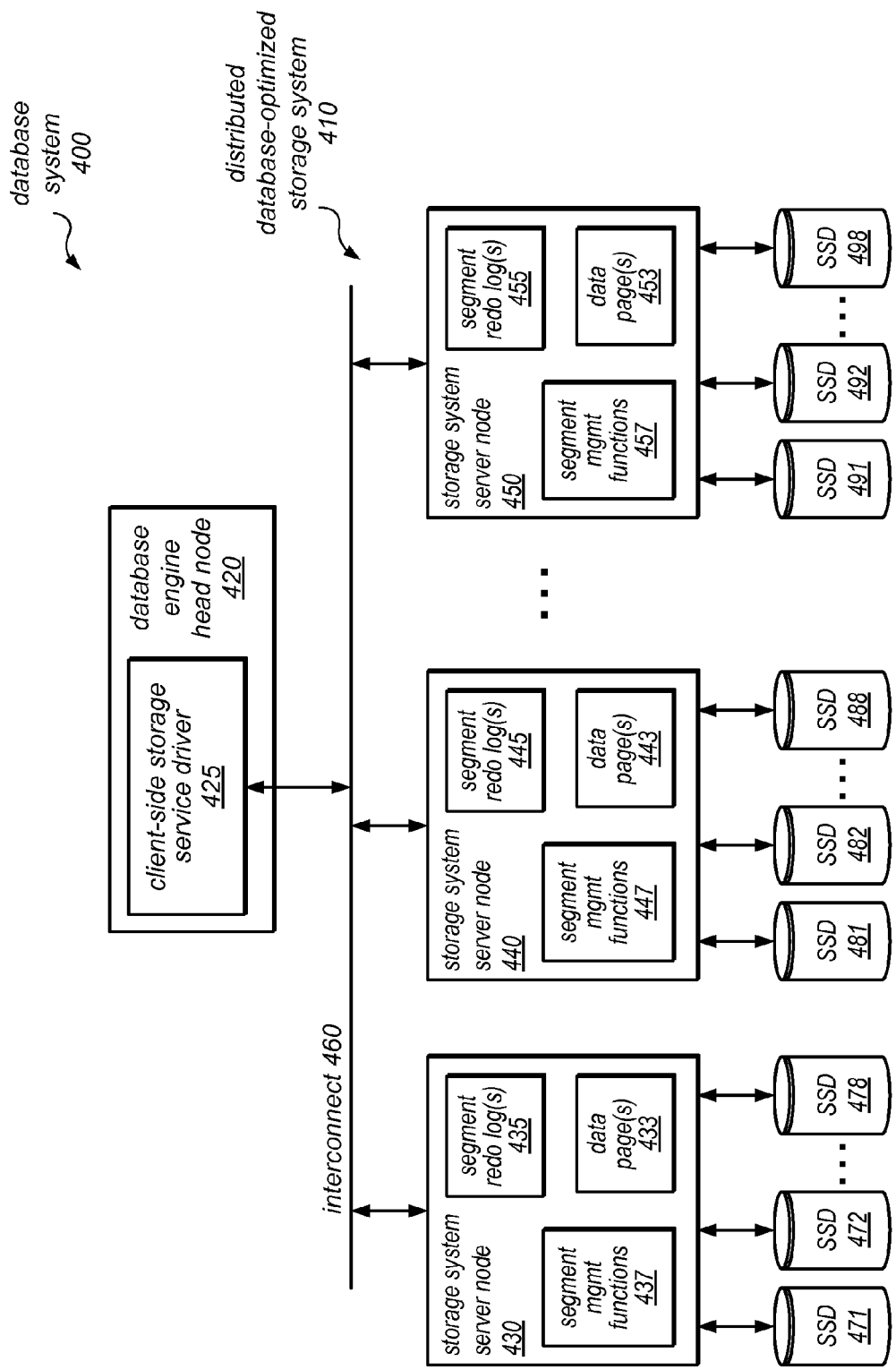
FIG. 4 is a block diagram illustrating a distributed database-optimized storage system configured to perform results set cache invalidation, according to one embodiment.

One embodiment of a distributed database-optimized storage system is illustrated by the block diagram in FIG. 4. In this example, a database system 400 includes a distributed database-optimized storage system 410, which communicates with a database engine head node 420 over interconnect 460. As in the example illustrated in FIG. 3, database engine head node 420 may include a client-side storage service driver 425. In this example, distributed database-optimized storage system 410 includes multiple storage system server nodes (including those shown as 430, 440, and 450), each of which includes storage for data pages and redo logs for the segment(s) it stores, and hardware and/or software configured to perform various segment management functions. For example, each storage system server node may include hardware and/or software configured to perform at least a portion of any or all of the following operations: replication (locally, e.g., within the storage node), coalescing of redo logs to generate data pages, log management (e.g., manipulating log records), crash recovery, and/or space management (e.g., for a segment). Each storage system server node may also have multiple attached storage devices (e.g., SSDs) on which data blocks may be stored on behalf of clients (e.g., users, client applications, and/or database service subscribers).

In the example illustrated in FIG. 4, storage system server node 430 includes data page(s) 433, segment redo log(s) 435, segment management functions 437, and attached SSDs 471-478. Again note that the label "SSD" may or may not refer to a solid-state drive, but may more generally refer to a local block storage volume, regardless of its underlying hardware. Similarly, storage system server node 440 includes data page(s) 443, segment redo log(s) 445, segment management functions 447, and attached SSDs 481-488; and storage system server node 450 includes data page(s) 453, segment redo log(s) 455, segment management functions 457, and attached SSDs 491-498.

In some embodiments, each of the storage system server nodes in the distributed database-optimized storage system may implement a set of processes running on the node server's operating system that manage communication with the database engine head node, e.g., to receive redo logs, send back data pages, etc. In some embodiments, all data blocks written to the distributed database-optimized storage system may be backed up to long-term and/or archival storage (e.g., in a remote key-value durable backup storage system).

Figure 5:
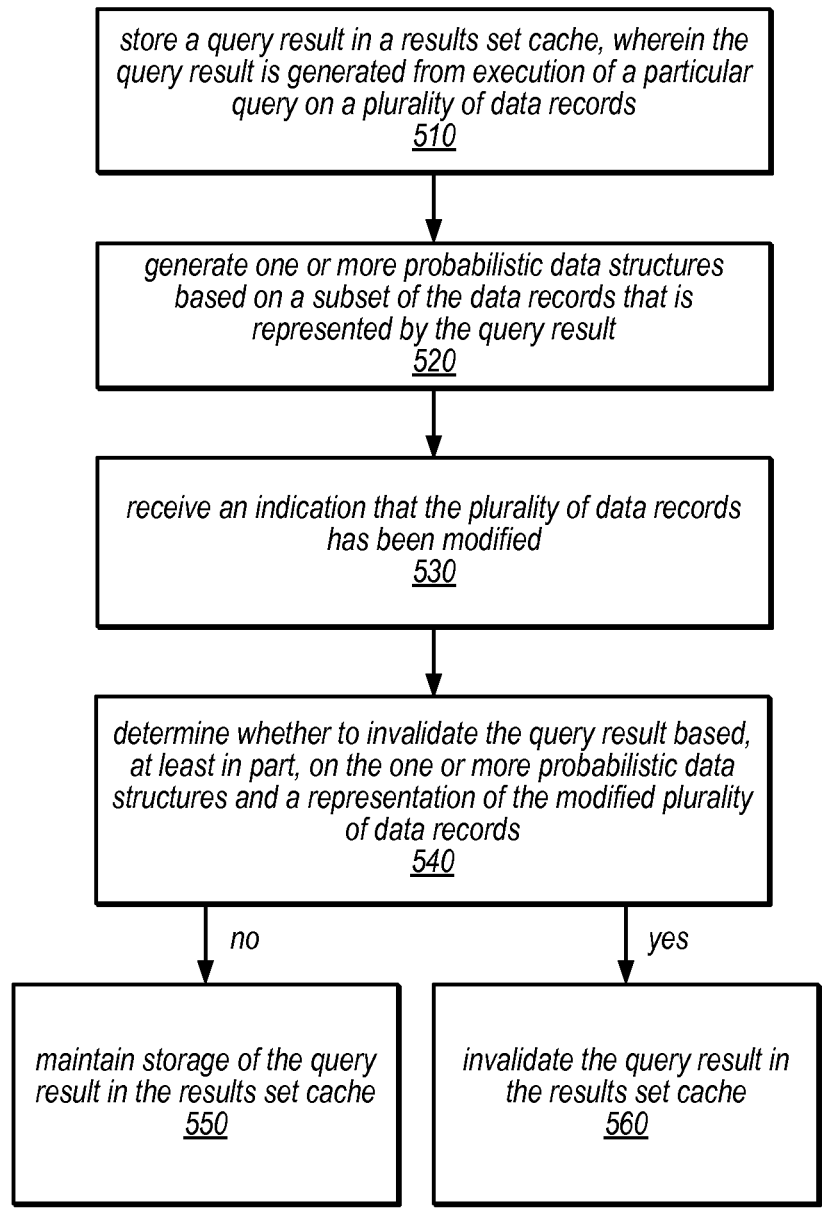
FIG. 5 is a flow diagram illustrating one embodiment of a method for results set cache invalidation in a web services-based database service.

Turning now to FIG. 5, in various embodiments, database system 300 may be configured to perform results set cache invalidation. While the method of FIG. 5 may be described as being performed by various components (e.g., nodes) of a distributed database system, such as query parsing, optimization and execution 305, client-side storage service driver 325, and/or database engine head nodes 320a, 320b, 320c, etc., the method need not be performed by any specific component, or by a database, in some cases. For instance, in some cases, the method of FIG. 5 may be performed by some other component or computer system, according to some embodiments. Or, in some cases, components of database system 300 may be combined or exist in a different manner than that shown in the example of FIG. 3. In various embodiments, the method of FIG. 5 may be performed by one or more nodes of a distributed database system, one of which is shown as the computer system of FIG. 6. The method of FIG. 5 is shown as one example implementation of a method for results set cache invalidation. In other implementations, the method of FIG. 5 may include additional or fewer blocks than are shown.

At 510, a particular query result may be stored in a results set cache. The query result may be generated from execution of a particular database query (or other type of query) on a plurality of data records (e.g., stored by a database service). For example, the database service may receive a database query (e.g., read request, SELECT statement, or other database query, etc.) to perform a read of record(s) stored by the database service from one or more clients of the database service. The database service may then execute the database query, for example, by requesting the data record(s) from the storage tier and then return the requested data record(s) to the client. The requested data record(s) may also be stored in the results set cache as the query result. Note that other particular query results, generated from execution of other queries, may also be stored in the results set cache.

In various embodiments, each executed query may not result in storing the query result in the results set cache. Instead, the database service may apply rules to determine which results to also store in the results set cache and which results to simply return to the requesting client. Example rules may include a frequency of occurrence of the particular database query, one or more preselected database queries, etc.

The stored query result can be used to return the same result for subsequently received occurrences of the same particular database query without having to re-execute the query. For example, if many clients ask the same question and submit the same query, as long as the cached query result in the results set cache has not been invalidated (e.g., according to the method of FIG. 5), then the cached query result may be returned to the client. In one embodiment, the database service may determine whether a received database query is equivalent to a database query for which a stored cache result in the results set cache is present. For example, the database service (e.g., some component of the primary node) may hash a string from a given database query (e.g., SQL statement) and associate the hash value(s) with the query result. Upon receiving a subsequent database query, a hash of the subsequent query may be computed and compared with stored hash values for a number of previous queries. If there is a match and there is a valid cached query result corresponding to the matched query, then the query need not be re-executed and the cached query result associated with that query may be returned to the client. Techniques other than the described hashing techniques to determine whether a given query is equivalent to another query may also be used in various embodiments.

As shown at 520, one or more probabilistic data structures may be generated based on the subset of the data records that is represented by the query result. The subset of data records that is represented by the query result may be the data records from which the query results depend. For example for a SELECT query that requests the employees with a last name starting with "A" from the table EMPLOYEES, the subset of data records that is represented by the results of the particular query includes the employees with a last name starting with "A". Note that, in one embodiment, the subset of data records may be represented by table identifier(s) (or class/type/set identifier for a non-database application of the disclosed techniques) and record identifier(s). In the employee example, the subset of data records may be the data records of employees with last name starting with "A" from the table EMPLOYEES and not the entire table EMPLOYEES. The subset of data records may be associated with record locators or other identifiers that are indicative of the records. For example, the data records of the employees with last names starting with "A" may be identified as records 0 through 31.

The probabilistic data structure may be usable to indicate whether a given value is likely within a set of values, such as the data values in the subset of data records. Example of probabilistic data structures include a bloom filter, a quotient filter, an approximate membership query, memory-efficient probabilistic data structure, space-efficient probabilistic data structure, Count-Min sketch, among others. The probabilistic data structure may be used, in various embodiments, to provide sufficient selectivity (e.g., discrimination or probability of a data value in a particular bucket) to invalidate only those data records that affect the results of a query. Invalidating only those data records that affect the results of a query is in contrast to a system that simply maintains a list of all tables that were inside the query and invalidates the cached query result in the results set cache if any data in any table changes (e.g., if an employee with last name of BAKER is changed to BAKER-SMITH, which would not have an effect on the employees with last name starting with "A")), even if those changes would not actually affect the results of the query associated with the invalidated query results.

As a simple concrete example of generating the probabilistic data structure, a SELECT query that requests the employees with a last name starting with "A" from the table EMPLOYEES may result in some query result. A bloom filter may be generated that is a less costly (e.g., in terms of storage requirements) representation of the records corresponding to the employees with last name starting with "A" (but not all of the records from the table EMPLOYEES). In such an example, the subset of data records represented in the results of the particular query includes the employees with a last name starting with "A".

In some embodiments, the one or more probabilistic data structures may represent the table(s) and the data records within the table(s) that are represented in the results of a particular query may be generated. In the employee example above, a probabilistic data structure may be generated that represents the table EMPLOYEES and the subset of data records for employees with last name starting with "A". In some embodiments, separate probabilistic data structures may be used, a first one that represents the table(s) that are represented in the results of a particular query and second one that represents the record(s) that are represented in the results of a particular query. In other embodiments, a single probabilistic data structure that represents both the table(s) and record(s) that are represented in the results of the particular query may be used. For example, a single bloom filter may include both the record locator(s) (e.g., identifier(s) of data records) and a table id hashed together.

In one embodiment, a given query result stored in the results set cache may be associated with one or more probabilistic data structures (e.g., the two probabilistic data structure or the single probabilistic data structure embodiments, etc.). Thus, one given query result stored in the results set cache may be associated with a table-based probabilistic data structure and a record-locator-based probabilistic data structure and another given query result stored in the results set cache may be associated with another table based probabilistic data structure and another record locator based probability data structure. Accordingly, in one embodiment, each cached query result may be associated with a respective one or more probabilistic data structures. Note, however, that if two different query results depend only on the table with an identifier of EMPLOYEES, then the table-based probabilistic data structures for those two different query results may be the same probabilistic data structure.

In various embodiments that utilize a bloom filter, the bloom filter may be represented as a bitmap, such as an array of bits. Different patterns of set bits in the bitmap may indicate whether a given value (e.g., an identifier of a given record) is represented. The number of bits in the bitmap may be determined according to the number of possible values that may be stored. For example, in some embodiments, the number of bits in the bitmap may be a factor of the number of possible data values, such as factor of 10. The bitmap may be populated (or the bits may be set) by applying multiple hash functions to the data values of the data to be stored (or stored), and setting bits in the locations in the bitmap corresponding to the output of the hash function. For instance, if the output of the hash functions applied to a given value corresponds to locations 1, 22, 39, and 76 in the bitmap, then the bits in the bitmap at locations 1, 22, 39, and 76 will be set (e.g., stored with a value of "1").

At 530, an indication that the plurality of data records has been modified may be received. For example, one or more components of a primary node (e.g., client-side storage service driver) may monitor updates to data records, including identifiers corresponding to particular modified data records. Such identifiers may include table identifiers and/or record locators. Accordingly, the system may be aware of which particular data records have been modified.

As illustrated at 540, it may be determined whether to invalidate the query result. Such a determination may be based on the one or more probabilistic data structures and on a representation of the modified plurality of data records. In one embodiment, the representation of the modified plurality of data records may be the results of applying the same hash functions that were used to generate the probabilistic data structure(s) to the modified data records. The probabilistic data structure(s) may then be used to determine whether one or more of the modified records have a probability of being included in the query results for a subsequent execution of the database query (or of being included in other query results stored in the results set cache for subsequent execution of other database queries). Note that, because probabilistic data structures are being used, false positives may occur. For instance, a comparison of the representation of the modified data record(s) with the probabilistic data structure(s) may indicate that there is no probability of being included in the query results or that there is a probability (but not a certainty) of being included in the query results. Using the bloom filter example from above, there may be a bit representation of the subset of records in the form of a bloom filter. The same hash function(s) used to generate the bloom filter may be executed on the modified records resulting in the representation (e.g., bit representation) of the modified records. If there is an overlap in bits when comparing the bloom filter with the representation of the modified data record(s), then there is a probability (e.g., greater than zero) of the one or more modified records being included in the query results for a subsequent execution of the database query.

As described herein, if it is determined that one or more of the modified plurality of data records have a probability of being included in the query result for a subsequent execution of the same database query, then the results cache entry associated with that probabilistic data structure(s) may be invalidated (e.g., deleted, indicated as invalid, etc.). Otherwise, storage of that results cache entry may be maintained.

In an embodiment using separate table-based (or class-based for implementations in systems other than databases) and record-based probabilistic data structures, the determining at block 540 may include first using the table-based probabilistic data structure to determine that a possibility exists that at least one of the modified data records data belongs to the table/class to which the subset of data records belongs. Using the last name "A" example from above, the table-based probabilistic data structure may be used to determine that a possibility exists that at least one of the modified data records data belongs to the table EMPLOYEES. If no possibility exists, (e.g., there is no overlap in bits in the comparison of the table-based probabilistic data structure and the representation of the modified data records), then the separate record-based probabilistic data structure need not be used and the results set cache entry may be maintained.

If, however, a record for BAKER has changed to BAKER-SMITH or if a record ADAM has been corrected to ADAMS, then using the table-based probabilistic data structure to determine if at least one of the modified data records belongs to the table EMPLOYEE results in a determining that a possibility exists that at least one of the modified data records data belongs to the table EMPLOYEE. If so, then it is possible that the corresponding results cache entry may be invalidated based on the use of the record-based probabilistic data structure. Accordingly, in response to determining that a possibility exists that at least one of the modified data records data belongs to the table to which the subset of data records belongs, the record-based probabilistic data structure may be used to determine whether a possibility exists that at least one record of the subset of data records corresponds to one of the modified data records. For example, if the record-based probabilistic data structure is generated based on record identifiers for the last names starting with "A" and if only the record for BAKER has changed to BAKER-SMITH, then using the record-based probabilistic data structure may result in a determination that there is no overlap in the modified data records and the subset of data records from which the record-based probabilistic data structure was generated. Accordingly, storage of that particular results set cache entry may be maintained.

In contrast, if the record-based probabilistic data structure is generated based on record identifiers for the last names starting with "A" and if the record ADAM has been changed to ADAMS, then using the record-based probabilistic data structure may result in a determination that there is a possibility of overlap in the modified data records and the subset of data records from which the record-based probabilistic data structure was generated. Accordingly, that particular results set cache entry may be invalidated.

In various embodiments, the order of using the probabilistic data structures may be switched. As demonstrated in the example above, in one embodiment, the table-based probabilistic data structure may be applied first followed by the record-based probabilistic data structure. In other embodiments, the reverse order may be used. Note that both probabilistic data structures may not need to applied, for example, if the application of one of them already excludes the possibility of overlap of the modified data records and the subset of data records (e.g., the record locators or table identifier of the modified data record is different than that of the subset of data records).

In some embodiments, the use of two separate probabilistic data structures may permit smaller probabilistic data structures to be used, thereby reducing the likelihood of false positives and overly conservative results set cache invalidations from occurring.

In various embodiments, subsequent execution of a particular query may result in a different query result in situations other than one of the subset of data records being modified. For example, a new record may be added or a record may be deleted, either of which may affect the query result. As a simple example, consider the last name with letter "A" example. Consider a scenario in which the EMPLOYEE table included no entries for employees with last name starting with "A". Based on execution of the query requesting employees with last name starting with "A", an entry may be stored in the results set cache. A modification to the plurality of data records may include adding a record for an employee with last name "ADAMS". While there is no overlap in the records modified and those used to generate the original query result and probabilistic data structure(s), the query result should be invalidated nevertheless. In one embodiment, the determining at block 540 may include determining a range (range checking) of the subset of data records with the probabilistic data structure (e.g., Count-Min sketch) being associated with individual ones of the subset of data records. For example, this may include recording a bit for the starting record in the page. Thus, even if somebody is added during a scan of the records, such an embodiment gives a way to do range locking rather than value locking.

At 550, if it has been determined at block 540 that the query result should not be invalidated, then storage of the query result in the results set cache may be maintained.

As shown at 560, if it has been determined at block 540 that the query result should be invalidated, then the query result in the results set cache may be invalidated (e.g., deleted, marked as invalid, etc.).

In various embodiments, the disclosed results cache invalidation techniques apply equally to row-based, columnar, and/or other types of databases, as well as non-database systems that cache results of queries.

The methods described herein may in various embodiments be implemented by any combination of hardware and software. For example, in one embodiment, the methods may be implemented by a computer system (e.g., a computer system as in FIG. 6) that includes one or more processors executing program instructions stored on a computer-readable storage medium coupled to the processors. The program instructions may be configured to implement the functionality described herein (e.g., the functionality of various servers and other components that implement the database services/systems and/or storage services/systems described herein).

The disclosed results cache invalidation techniques may provide for more selective and less aggressive results set cache invalidation. Moreover, by using separate probabilistic data structures and splitting between table and record bits, the likelihood of false positives and overly conservation results set cache invalidation may be reduced. In addition, by using range checking, results set cache invalidation may occur even where the modified records do not overlap with the previously scanned records from which the query result depend (e.g., for added or deleted records that affect the query result).

Figure 6:
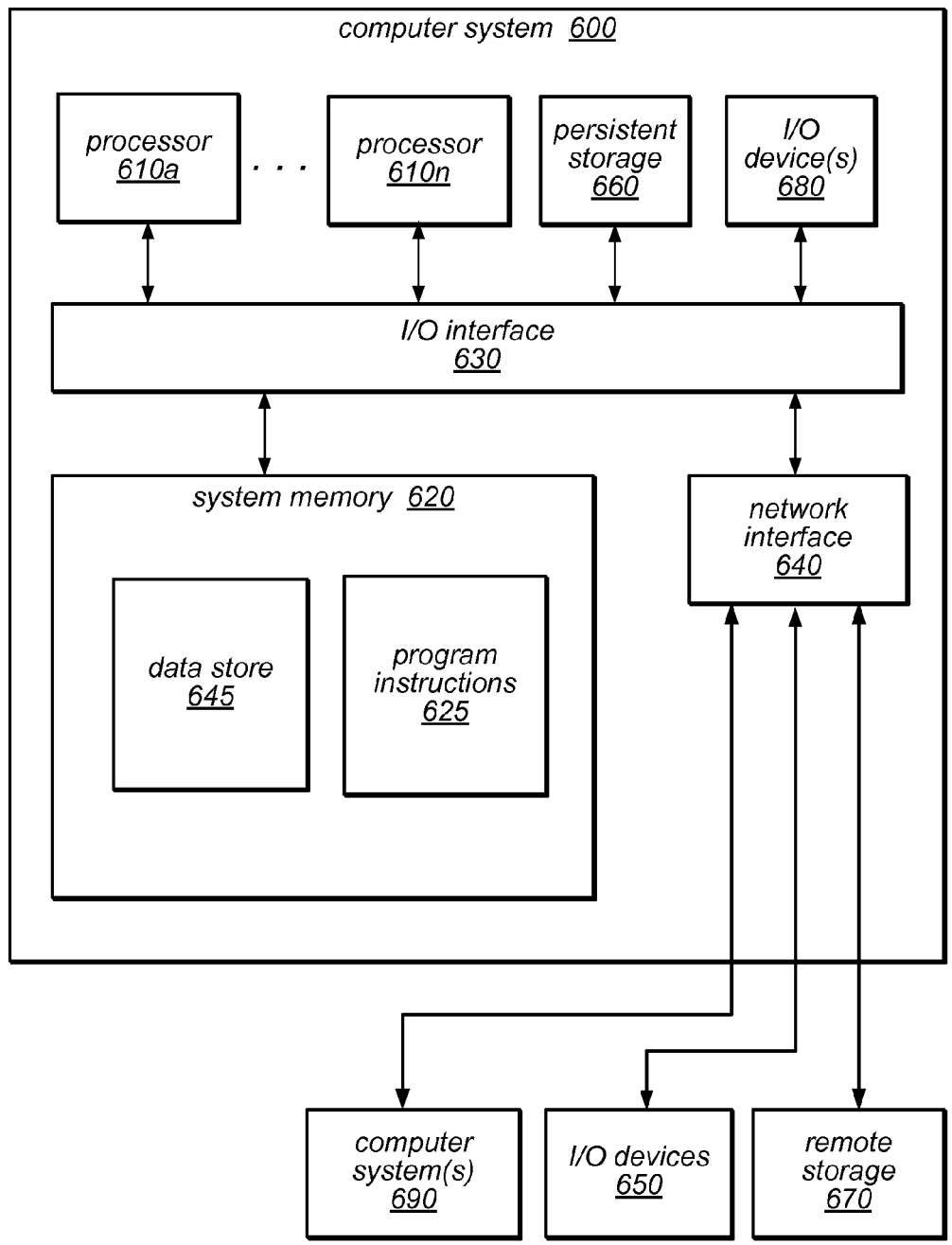
FIG. 6 is a block diagram illustrating a computer system configured to implement results set cache invalidation, according to various embodiments.

FIG. 6 is a block diagram illustrating a computer system configured to implement at least a portion of the database systems described herein, according to various embodiments. For example, computer system 600 may be configured to implement a primary (e.g., database engine head) node of a database tier, or one of a plurality of storage nodes of a separate distributed database-optimized storage system that stores database tables and associated metadata on behalf of clients of the database tier, in different embodiments. Computer system 600 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 600 includes one or more processors 610 (any of which may include multiple cores, which may be single or multi-threaded) coupled to a system memory 620 via an input/output (I/O) interface 630. Computer system 600 further includes a network interface 640 coupled to I/O interface 630. In various embodiments, computer system 600 may be a uniprocessor system including one processor 610, or a multiprocessor system including several processors 610 (e.g., two, four, eight, or another suitable number). Processors 610 may be any suitable processors capable of executing instructions. For example, in various embodiments, processors 610 may be general-purpose or embedded processors implementing any of a variety of instruction set architectures (ISAs), such as the x86, PowerPC, SPARC, or MIPS ISAs, or any other suitable ISA. In multiprocessor systems, each of processors 610 may commonly, but not necessarily, implement the same ISA. The computer system 600 also includes one or more network communication devices (e.g., network interface 640) for communicating with other systems and/or components over a communications network (e.g. Internet, LAN, etc.). For example, a client application executing on system 600 may use network interface 640 to communicate with a server application executing on a single server or on a cluster of servers that implement one or more of the components of the database systems described herein. In another example, an instance of a server application executing on computer system 600 may use network interface 640 to communicate with other instances of the server application (or another server application) that may be implemented on other computer systems (e.g., computer systems 690).

In the illustrated embodiment, computer system 600 also includes one or more persistent storage devices 660 and/or one or more I/O devices 680. In various embodiments, persistent storage devices 660 may correspond to disk drives, tape drives, solid state memory, other mass storage devices, or any other persistent storage device. Computer system 600 (or a distributed application or operating system operating thereon) may store instructions and/or data in persistent storage devices 660, as desired, and may retrieve the stored instruction and/or data as needed. For example, in some embodiments, computer system 600 may host a storage system server node, and persistent storage 660 may include the SSDs attached to that server node.

Computer system 600 includes one or more system memories 620 that are configured to store instructions and data accessible by processor(s) 610. In various embodiments, system memories 620 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 620 may contain program instructions 625 that are executable by processor(s) 610 to implement the methods and techniques described herein. In various embodiments, program instructions 625 may be encoded in platform native binary, any interpreted language such as Java™ byte-code, or in any other language such as C/C++, Java™, etc., or in any combination thereof. For example, in the illustrated embodiment, program instructions 625 include program instructions executable to implement the functionality of a database engine head node of a database tier, or one of a plurality of storage nodes of a separate distributed database-optimized storage system that stores database tables and associated metadata on behalf of clients of the database tier, in different embodiments. In some embodiments, program instructions 625 may implement multiple separate clients, server nodes, and/or other components.

In some embodiments, program instructions 625 may include instructions executable to implement an operating system (not shown), which may be any of various operating systems, such as UNIX, LINUX, Solaris™, MacOS™, Windows™, etc. Any or all of program instructions 625 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 600 via I/O interface 630. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 600 as system memory 620 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 640.

In some embodiments, system memory 620 may include data store 645, which may be configured as described herein. For example, the information described herein as being stored by the database tier (e.g., on a database engine head node), such as a transaction log, an undo log, cached page data, or other information used in performing the functions of the database tiers described herein may be stored in data store 645 or in another portion of system memory 620 on one or more nodes, in persistent storage 660, and/or on one or more remote storage devices 670, at different times and in various embodiments. Similarly, the information described herein as being stored by the storage tier (e.g., redo log records, coalesced data pages, and/or other information used in performing the functions of the distributed storage systems described herein) may be stored in data store 645 or in another portion of system memory 620 on one or more nodes, in persistent storage 660, and/or on one or more remote storage devices 670, at different times and in various embodiments. In general, system memory 620 (e.g., data store 645 within system memory 620), persistent storage 660, and/or remote storage 670 may store data blocks, replicas of data blocks, metadata associated with data blocks and/or their state, database configuration information, and/or any other information usable in implementing the methods and techniques described herein.

In one embodiment, I/O interface 630 may be configured to coordinate I/O traffic between processor 610, system memory 620 and any peripheral devices in the system, including through network interface 640 or other peripheral interfaces. In some embodiments, I/O interface 630 may perform any necessary protocol, timing or other data transformations to convert data signals from one component (e.g., system memory 620) into a format suitable for use by another component (e.g., processor 610). In some embodiments, I/O interface 630 may include support for devices attached through various types of peripheral buses, such as a variant of the Peripheral Component Interconnect (PCI) bus standard or the Universal Serial Bus (USB) standard, for example. In some embodiments, the function of I/O interface 630 may be split into two or more separate components, such as a north bridge and a south bridge, for example. Also, in some embodiments, some or all of the functionality of I/O interface 630, such as an interface to system memory 620, may be incorporated directly into processor 610.

Network interface 640 may be configured to allow data to be exchanged between computer system 600 and other devices attached to a network, such as other computer systems 690 (which may implement one or more storage system server nodes, database engine head nodes, and/or clients of the database systems described herein), for example. In addition, network interface 640 may be configured to allow communication between computer system 600 and various I/O devices 650 and/or remote storage 670. Input/output devices 650 may, in some embodiments, include one or more display terminals, keyboards, keypads, touchpads, scanning devices, voice or optical recognition devices, or any other devices suitable for entering or retrieving data by one or more computer systems 600. Multiple input/output devices 650 may be present in computer system 600 or may be distributed on various nodes of a distributed system that includes computer system 600. In some embodiments, similar input/output devices may be separate from computer system 600 and may interact with one or more nodes of a distributed system that includes computer system 600 through a wired or wireless connection, such as over network interface 640. Network interface 640 may commonly support one or more wireless networking protocols (e.g., Wi-Fi/IEEE 802.11, or another wireless networking standard). However, in various embodiments, network interface 640 may support communication via any suitable wired or wireless general data networks, such as other types of Ethernet networks, for example. Additionally, network interface 640 may support communication via telecommunications/telephony networks such as analog voice networks or digital fiber communications networks, via storage area networks such as Fibre Channel SANs, or via any other suitable type of network and/or protocol. In various embodiments, computer system 600 may include more, fewer, or different components than those illustrated in FIG. 6 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more web services. For example, a database engine head node within the database tier of a database system may present database services and/or other types of data storage services that employ the distributed storage systems described herein to clients as web services. In some embodiments, a web service may be implemented by a software and/or hardware system designed to support interoperable machine-to-machine interaction over a network. A web service may have an interface described in a machine-processable format, such as the Web Services Description Language (WSDL). Other systems may interact with the web service in a manner prescribed by the description of the web service's interface. For example, the web service may define various operations that other systems may invoke, and may define a particular application programming interface (API) to which other systems may be expected to conform when requesting the various operations.

In various embodiments, a web service may be requested or invoked through the use of a message that includes parameters and/or data associated with the web services request. Such a message may be formatted according to a particular markup language such as Extensible Markup Language (XML), and/or may be encapsulated using a protocol such as Simple Object Access Protocol (SOAP). To perform a web services request, a web services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the figures and described herein represent example embodiments of methods. The methods may be implemented manually, in software, in hardware, or in a combination thereof. The order of any method may be changed, and various elements may be added, reordered, combined, omitted, modified, etc.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

The invention claimed is:

1. A system, comprising:
a plurality of computing nodes, each of which comprises at least one processor and a memory, wherein the plurality of computing nodes are configured to collectively implement a database service configured to:
store a query result as a new entry in a results set cache comprising a plurality of entries, wherein the query result is generated from execution of a database query on a plurality of data records stored by the database service;
write a probabilistic data structure in response to storing the new entry in the results set cache, wherein respective entries in the results set cache correspond to respective ones of a plurality of probabilistic data structures usable to selectively invalidate the respective entries in the results set cache based, at least in part, on a subset of the plurality of data records that is reflected in the query result;
receive an indication that the plurality of data records has been modified; and
determine whether to invalidate the one or more entries in the results set cache based, at least in part, on a comparison between respective ones of the plurality of probabilistic data structures corresponding to respective entries in the results set cache and a representation of the modified plurality of data records, wherein the comparison indicates, with a probability of a false positive, whether the respective entries represented by the probabilistic data structure correspond to the modified plurality of data records.

2. The system of claim 1, wherein said determining includes using the one or more probabilistic data structures to determine whether one or more of the modified plurality of data records have a probability of being included in the query result for a subsequent execution of the same database query.

3. The system of claim 2, wherein the database service is further configured to invalidate the query result in the results set cache in response to a determination that one or more of the modified plurality of data records have a probability of being included in the query result for a subsequent execution of the same database query.

4. The system of claim 1, wherein the one or more probabilistic data structures are indicative of a table identifier of a table in which the subset of data records is stored and are further indicative of one or more record identifiers corresponding to the subset of data records.

5. A method, comprising:
performing, by one or more nodes:
storing a first query result as a new entry in a results set cache comprising a plurality of entries, wherein the first query result is generated from execution of a first query on a plurality of data records stored by the one or more nodes;
writing a first probabilistic data structure in response to storing the new entry in the results set cache, wherein respective entries in the results set cache correspond to respective ones of a plurality of probabilistic data structures usable to selectively invalidate the respective entries in the results set cache based, at least in part, on a first subset of the plurality of data records that is represented by the first query result;
receiving an indication that the plurality of data records has been modified; and
determining whether to invalidate the one or more entries in the results set cache based, at least in part, on a comparison between respective ones of the plurality of probabilistic data structures corresponding to respective entries in the results set cache and a representation of the modified plurality of data records, wherein the comparison indicates, with a probability of a false positive, whether the respective entries represented by the probabilistic data structure correspond to the modified plurality of data records.

6. The method of claim 5, further comprising:
invalidating the first query result in the results set cache in response to a determination that one or more of the modified plurality of data records have a probability of being included in the first query result for a subsequent execution of the first query.

7. The method of claim 6, wherein said invalidating the first query result is performed regardless of whether subsequent execution of the first query on the modified plurality of data records would generate a different query result.

8. The method of claim 5, further comprising:
maintaining storage of the first query result in the results set cache in response to a determination that one or more of the modified plurality of data records do not have a probability of being included in the first query result for a subsequent execution of the first query.

9. The method of claim 8, wherein the first probabilistic data structure is a bloom filter.

10. The method of claim 5, further comprising:
storing a second query result in the results set cache, wherein the second query result is generated from execution of a second query on the plurality of data records;
generating a second probabilistic data structure based, at least in part, on a second subset of the plurality of data records that is represented by the second query result; and
determining whether to invalidate to invalidate the second query result in the results set cache based, at least in part, on the second probabilistic data structure and a representation of the modified plurality of data records.

11. The method of claim 5, wherein said determining includes comparing the first probabilistic data structure with a representation of the modified data records to determine whether there is a probability that subsequent execution of the first query on the modified plurality of data records would generate a different query result.

12. The method of claim 5, wherein the first probabilistic data structure is indicative of respective record identifiers of the first subset of data records and is further indicative of a class identifier of a class to which the first subset of data records belongs.

13. The method of claim 5, further comprising:
generating a second probabilistic data structure based, at least in part, on the first subset of the plurality of data records that is represented by the first query result, wherein the first and second probabilistic data structures are associated with the first query result stored in the results set cache,
wherein the first probabilistic data structure is indicative of a class identifier of a class to which the first subset of data records belongs, and wherein the second probabilistic data structure is indicative of respective record identifiers of the first subset of data records, wherein said determining is further based, at least in part, on the second probabilistic data structure.

14. The method of claim 13, wherein said determining whether includes:

after said receiving the indication that the plurality of data records has been modified, using the first probabilistic data structure to determine that a possibility exists that at least one of the modified data records data belongs to the class to which the first subset of data records belongs; and in response to said determining that a possibility exists that at least one of the modified data records data belongs to the class to which the first subset of data records belongs, using the second probabilistic data structure to determine that a possibility exists that at least one record of the first subset of data records corresponds to one of the modified data records;

wherein said determining whether to invalidate the first query result in the results set cache includes determining to invalidate the first query result based, at least in part, on:

said determining that a possibility exists that at least one of the modified data records data belongs to the class to which the first subset of data records belongs, and said determining that a possibility exists that at least one record of the first subset of data records corresponds to one of the modified data records.

15. The method of claim 5, wherein the modified plurality of data records includes a different number of records than the plurality of data records included before it was modified, and wherein said determining includes determining a range of the first subset of data records, wherein the first probabilistic data structure is a Count-Min sketch associated with individual ones of the first subset of data records.

16. A non-transitory computer-readable storage medium storing program instructions, wherein the program instructions are computer-executable to:

store a query result as a new entry in a results set cache comprising a plurality of entries, wherein the query result is generated from execution of a query on a plurality of data records;

write a probabilistic data structure in response to storing the new entry in the results set cache, wherein respective entries in the results set cache correspond to respective ones of a plurality of probabilistic data structures usable to selectively invalidate the respective entries in the results set cache based, at least in part, on a subset of the plurality of data records that is reflected in the query result;

receive an indication that the plurality of data records has been modified; and determine whether to invalidate the one or more entries in the results set cache based, at least in part, on a comparison between respective ones of the plurality of probabilistic data structures corresponding to respective entry in the results set cache and a representation of the modified plurality of data records, wherein the comparison indicates, with a probability of a false positive, whether the respective entries represented by the probabilistic data structure correspond to the modified plurality of data records.

17. The non-transitory computer-readable storage medium of claim 16, wherein said determining includes using the one or more probabilistic data structures to determine whether one or more of the modified plurality of data records have a probability of being included in the query result for a subsequent execution of the same database query.

18. The non-transitory computer-readable storage medium of claim 16, wherein said determining includes comparing the one or more probabilistic data structures with a representation of the modified data records to determine whether there is a probability that subsequent execution of the query on the modified plurality of data records would generate a different query result.

19. The non-transitory computer-readable storage medium of claim 16, the one or more probabilistic data structures are indicative of a class of the subset of data records and are further indicative of one or more individual records of the class.

20. The non-transitory computer-readable storage medium of claim 19, wherein the one or more probabilistic data structures includes a first bloom filter that is indicative of the class and a second bloom filter that is indicative of the one or more individual records of the class corresponding to the subset of data records.

* * * * *